United States Patent
Kim et al.

(10) Patent No.: US 8,992,807 B2
(45) Date of Patent: Mar. 31, 2015

(54) METHOD OF MANUFACTURING DEFORMATION-CAPABLE GRAPHENE SHEET, DEFORMATION-CAPABLE GRAPHENE SHEET, AND DEVICE USING THE SAME

(75) Inventors: Keun-soo Kim, Suwon (KR);
Jong-hyun Ahn, Suwon (KR);
Byung-hee Hong, Suwon (KR)

(73) Assignees: Samsung Techwin Co., Ltd., Changwon (KR); Sungkyunkwan University Foundation for Corporate Collaboration, Suwon (KR)

(*) Notice: Subject to any disclaimer, the term of this patent is extended or adjusted under 35 U.S.C. 154(b) by 772 days.

(21) Appl. No.: 13/004,328

(22) Filed: Jan. 11, 2011

(65) Prior Publication Data

US 2011/0171427 A1    Jul. 14, 2011

Related U.S. Application Data

(60) Provisional application No. 61/282,289, filed on Jan. 14, 2010.

(51) Int. Cl.
*C30B 23/02* (2006.01)
*C01B 31/04* (2006.01)
*B82Y 30/00* (2011.01)
*B82Y 40/00* (2011.01)

(52) U.S. Cl.
CPC ............ *C01B 31/0469* (2013.01); *B82Y 30/00* (2013.01); *B82Y 40/00* (2013.01); *C01B 31/0453* (2013.01); *C01B 2204/04* (2013.01)
USPC ........................................ 264/29.7; 423/448

(58) Field of Classification Search
USPC ........................................ 264/29.7; 423/448
See application file for complete search history.

(56) References Cited

U.S. PATENT DOCUMENTS

| | | | |
|---|---|---|---|
| 7,521,292 B2* | 4/2009 | Rogers et al. | 438/118 |
| 2011/0014457 A1* | 1/2011 | Quitoriano et al. | 428/336 |

* cited by examiner

*Primary Examiner* — Galen Hauth
(74) *Attorney, Agent, or Firm* — Sughrue Mion, PLLC (57) ABSTRACT

A graphene sheet and a method of manufacturing the graphene sheet are provided. The method includes: growing a graphene sheet on a graphene growth support by applying carbon sources and heat to the graphene growth support, the graphene growth support including a carbonization catalyst; and forming at least one ripple on the graphene sheet by cooling at least one of the graphene growth support and the graphene sheet, wherein the graphene growth support and the graphene sheet have different thermal expansion coefficients.

10 Claims, 11 Drawing Sheets

METHOD OF MANUFACTURING DEFORMATION-CAPABLE GRAPHENE SHEET, DEFORMATION-CAPABLE GRAPHENE SHEET, AND DEVICE USING THE SAME

CROSS-REFERENCE TO RELATED PATENT APPLICATION

This application claims priority from U.S. Provisional Application No. 61/282,289, filed on Jan. 14, 2010, the disclosure of which is incorporated herein in its entirety by reference.

BACKGROUND

1. Field

Methods and apparatuses consistent with exemplary embodiments relate to manufacturing a graphene sheet, the graphene sheet, and a device using the same.

2. Description of the Related Art

General graphite is a stack of two-dimensional graphene having a plate shape in which carbon atoms are connected to one another in a hexagonal shape.

Graphene has very useful properties different from those of existing materials. One remarkable property of graphene is that when electrons move in graphene, they move as if the mass of the electrons is zero. This means that the electrons move at a speed at which light moves in vacuum, that is, at the speed of light. The electron mobility of currently well-known graphene amounts to a maximum of 200,000 $cm^2/Vs$. Graphene exhibits an abnormal half-integer quantum Hall effect with respect to electrons and holes, and exhibits a fractional quantum Hall effect when the graphene is suspended in the air.

Moreover, since the electrical properties of graphene vary according to the crystalline directivity of graphene having a given thickness, a user may provide an electrical property in a direction which the user selects, and thus, may easily design a device. Such electrical properties of graphene are compared with those of carbon natnotubes (CNT) whose metallic and semiconductive electrical properties vary according to the chirality and the diameter of the CNT. CNT should undergo separation, which is difficult, in order to use a particular semiconductor property and a particular metallic property. Moreover, graphene is economically favorable compared with CNT that undergoes refinement after synthesis. Therefore, graphene may be effectively used in carbon-based electric or electromagnetic devices and the like.

Examples of a graphene sheet manufacturing method include a micromechanical method and a SiC crystal pyrolysis method.

In the micromechanical method, a tape is attached to a graphite sample, and then, detached therefrom, thereby obtaining a graphene sheet, which is detached from the graphite sample, on the surface of the tape.

In the SiC crystal pyrolysis method, when SiC single crystal is heated, SiC on the surface of SiC single crystal is decomposed and Si is removed, and then, a graphene sheet is obtained from carbon (C).

SUMMARY

One or more exemplary embodiments provide a technique of manufacturing a graphene sheet by forming, on the graphene sheet, ripples that facilitate deformation-capability.

According to an aspect of an exemplary embodiment, there is provided a method of manufacturing a graphene sheet, the method including: growing a graphene sheet on a graphene growth support by applying carbon sources and heat to the graphene growth support, the graphene growth support including a carbonization catalyst; and forming at least one ripple on the graphene sheet by cooling at least one of the graphene growth support and the graphene sheet, wherein the graphene growth support and the graphene sheet have different thermal expansion coefficients.

In the growing the graphene sheet, when the graphene sheet is grown, at least one of a height and a width of the at least one ripple may be controlled by changing a thickness of the graphene sheet.

In the forming the ripples, during the cooling, at least one of a height and a width of the at least one ripple may be controlled by changing a cooling rate.

The method may further include: bringing the ripple-formed graphene sheet into contact with a stretched elastic body; and forming a profile repeatedly rising and falling on the graphene sheet by shrinking the stretched elastic body to increase deformation-capability.

After the increasing of the deformation-capability, the graphene sheet of which the deformation-capability has been increased may have a wavy shape or a buckle shape on the elastic body.

After the increasing of the deformation-capability, a graphene sheet of which the deformation-capability has been increased may have a ribbon shape having a profile repeatedly rising and falling in a direction of one axis or in directions of at least two axes, or a sheet shape having the profile repeatedly rising and falling in a direction of one axis or in directions of at least two axes.

The stretched elastic body may be stretched in a direction of one axis or in directions of multiple axes.

The elastic body may be a polymer elastic body having silicon-based or ethylene chains.

According to an aspect of another exemplary embodiment, there is provided a graphene sheet grown on a graphene growth support which includes a carbonization catalyst, the graphene sheet including at least one ripple, wherein the at least one ripple is formed using at least a difference between a thermal expansion coefficient of the graphene growth support and a thermal expansion coefficient of the graphene sheet.

The at least one ripple may have a height of 50-300 nm and a width of 10-200 nm.

The graphene sheet may have a thickness of 1 to 50 layers.

The graphene sheet may tolerate deformation that is greater than 0% and no more than 5% of an original length of the graphene sheet.

According to an aspect of another exemplary embodiment, there is provided a graphene sheet unit including the above graphene sheet and an elastic body contacting the graphene sheet, wherein the graphene sheet may include a profile that repeatedly rises and falls.

The graphene sheet may tolerate deformation that is greater than 0% and no more than 30% of an original length of the graphene sheet.

The graphene sheet may have a wavy shape or a buckle shape on the plate-shaped elastic body.

The wavy shape or the buckle shape of the graphene sheet may have a height of 1-10 μm and a width of 1-30 μm.

According to an aspect of another exemplary embodiment, there is provided a device including a graphene sheet grown on a graphene growth support including a carbonization catalyst, wherein at least one ripple is formed on the graphene sheet, and the at least one ripple is formed using a difference between a thermal expansion coefficient of the graphene growth support and a thermal expansion coefficient of the graphene sheet.

An elastic body may contact the graphene sheet, and the graphene sheet may include a profile that repeatedly rises and falls.

The graphene sheet may have a wavy shape or a buckle shape on the plate-shaped elastic body.

The graphene sheet may be used as an electrode material.

BRIEF DESCRIPTION OF THE DRAWINGS

The above and other aspects will become more apparent by describing in detail exemplary embodiments thereof with reference to the attached drawings, in which:

FIGS. 1A-1C illustrate a grown graphene sheet according to exemplary embodiments, wherein

DETAILED DESCRIPTION OF EXEMPLARY EMBODIMENTS

Exemplary embodiments will now be described more fully with reference to the attached drawings.

In the present specification, deformation denotes all possible shape changes such as bending, spreading, extending, compression, twisting, warping, wrinkling, and the like. The shape changes imply not only changes in one direction but also changes in all directions. Thus, the meaning of deformability implies, for example, stretchable, bendable, flexible, and the like. In the present specification, deformation-capability denotes a property of preventing or reducing a change in a physical property change, such as an electrical and/or mechanical property such as a resistance value and the like, that is obtained due to a permanent or temporary deformation. In the present specification, a ripple denotes a shape that rises or falls on a portion of a surface of a graphene sheet.

In the present specification, the width of a ripple in a cross-section thereof denotes a length between a point where the ripple starts to rise (or fall) and a point where the ripple finishes falling (or rising), and the height of the ripple denotes the height of an inflection point (a point at which rising or falling changes to falling or rising) of the ripple, that is, a vertical length ranging from the inflection point to the flat surface of the graphene sheet.

In the present specification, in a profile that repeatedly rises and falls, the height thereof denotes the height of a inflection point at which rising or falling changes to falling or rising, that is, a vertical length ranging from the inflection point to a flat surface where neither rising nor falling occurs, and the width thereof denotes a length between a point where rising (or falling) starts and a point where falling (or rising) is finished.

In the present specification, a wavy shape denotes a profile in which a graphene sheet and an elastic body contacting the graphene sheet repeatedly rise and fall together.

In the present specification, a buckle shape has a profile in which the graphene sheet repeatedly rises and falls on the elastic body, and denotes a shape in which the inflection points of the graphene sheet contact the elastic body.

According to an exemplary embodiment, a graphene growth support, as will be explained later, is formed of a carbonization catalyst for growing graphene, or includes the carbonization catalyst and an additional substrate formed below the carbonization catalyst. According to an exemplary embodiment, a graphene growth support may be formed of one or more materials different from the carbonization catalyst.

In the exemplary embodiments, carbon sources and heat are provided onto a graphene growth support including a carbonization catalyst to grow a graphene sheet, and then, at least one of the graphene growth support and the graphene sheet is cooled. Here, the graphene growth support and the graphene sheet have different thermal expansion coefficients. Thus, when the graphene sheet and the graphene growth support contacting the graphene sheet are cooled together, the graphene sheet and the graphene growth support, which are thermally expanded by different degrees, are shrunk by different degrees, whereby at least one ripple is formed on the graphene sheet. To form the at least one ripple on the graphene sheet, a support including a catalyst layer having a thermal expansion coefficient greater than a typical thermal expansion coefficient of graphene is used.

The formed at least one ripple may give deformation-capability to the graphene sheet. For example, in the case of graphene sheets not having a ripple formed therein, various types of deformation are generated due to application of an external force, and thus, mechanical damage such as cracks, fractures, or the like may be generated on the graphene sheet. Accordingly, for example, an electrical resistance value or the like may increase. At least one ripple formed on the graphene sheet may prevent the electrical resistance value or the like of the graphene sheet from increasing or may reduce the degree of increase. That is, the at least one ripple may provide deformation-capability to the graphene sheet.

Moreover, the deformation-capability may be further increased by providing a repeatedly rising and falling profile to the graphene sheet having the at least one ripple formed therein. The height and the width of the repeatedly rising and falling profile may be greater (for example, about 10-30 times greater) than those of the at least one ripple.

Nonrestrictive examples of a carbonization catalyst used in the exemplary embodiments may include Ni, Co, Fe, Pt, Au, Al, Cr, Cu, Mg, Mn, Mo, Rh, Si, Ta, Ti, W, U, V, Zr, and a combination of two or more of these materials. A film comprising a carbonization catalyst may be thin or thick. When the carbonization catalyst film is thin, the thickness thereof may be 1 to 1000 nm. When the carbonization catalyst film is thick, the thickness thereof may be 0.01 to 5 mm.

A manufacturer may adjust the thickness of a graphene sheet by changing the thickness of the carbonization catalyst film. In other words, the manufacturer may form a desired number of graphene layers or a graphene layer having a desired thickness by controlling a thickness to which the carbonization catalyst film is formed.

Figure 1A:
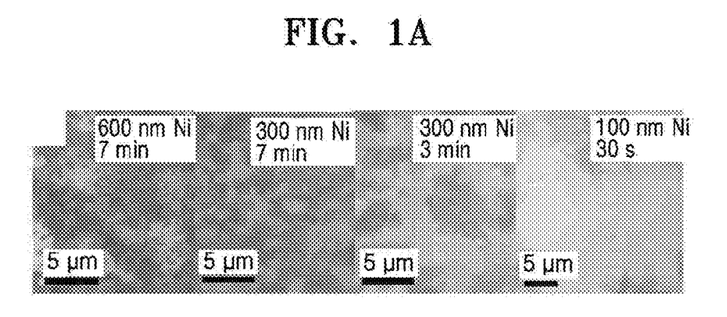
FIG. 1A is an optical microscope image of graphene layers according to different from one another in a graphene growth time and a thickness of a catalyst used for growing the graphene layers.
Figure 1B:
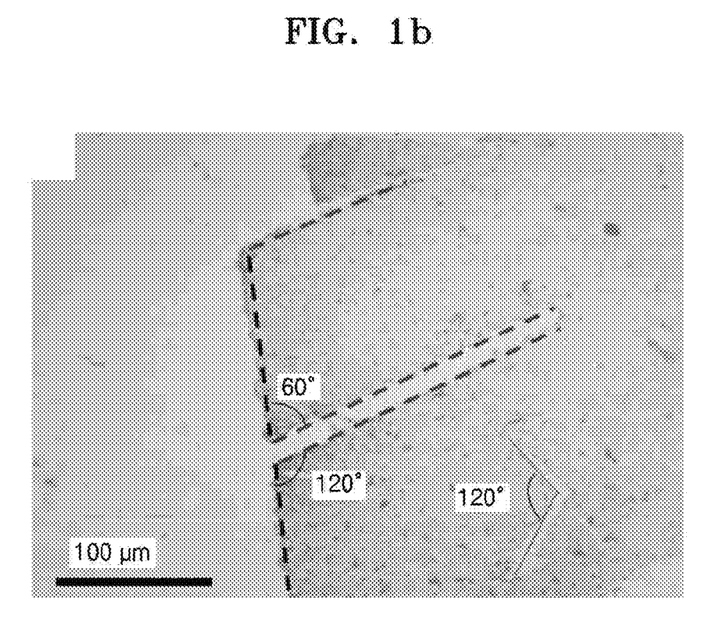
FIG. 1B is an optical microscope image showing a very large grain having a size of 100 µm or greater after graphene grown under optimal conditions is transferred.
Figure 1C:
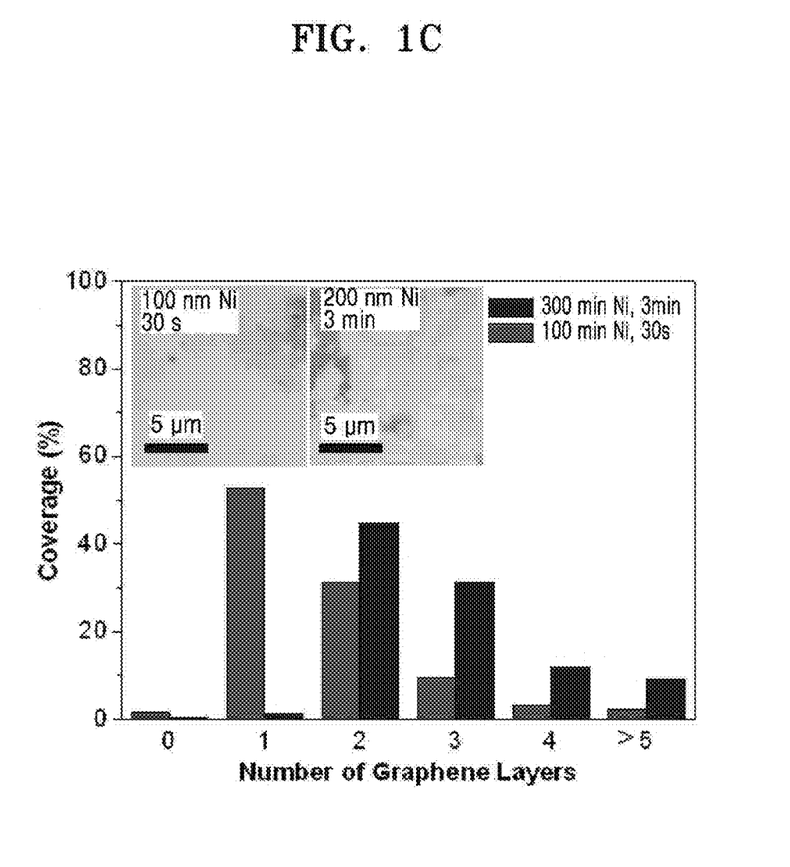
FIG. 1C is a histogram showing the numbers of graphene layers grown with different reaction time and different catalyst thicknesses.

FIG. 1A is an optical microscope image of graphene layers different from one another in a graphene growth time and a thickness of a catalyst used for growing the graphene layers. As the catalyst thickness becomes smaller and the growth time becomes shorter, a thinner graphene layer is formed. FIG. 1B is an optical microscope image showing a very large grain having a size of 100 μm or greater after graphene grown under the optimal conditions is transferred. FIG. 1C is a histogram showing a comparison between the numbers of graphene layers grown with different growth times and different catalyst thicknesses. As the catalyst thickness becomes smaller and the growth time becomes shorter, a monolayer graphene has a larger area.

The manufacturer may improve the electrical, optical, and chemical properties and the like of formed graphene by reducing defects such as a grain boundary by increasing the size of metal grains of a carbonization catalyst film by using $H_2$ gas, a thermal treatment process, and the like.

There are several methods of forming graphene by providing carbon sources and heat onto a graphene growth support, such as a carbonization catalyst film or which includes a carbonization catalyst film, formed on a substrate such as silicon oxide or the like.

Nonrestrictive examples of these methods may include a chemical vapor deposition (CVD) method of growing graphene by injecting vapor carbon supply sources and performing a thermal treatment process on a carbonization catalyst film. In detail, after a carbonization catalyst is formed in a film shape, the carbonization catalyst film is put into a chamber, and thermal treatment is performed, for example, at a temperature of 300 to 2000° C. while injecting carbon supply sources, such as carbon monoxide, ethane, ethylene, ethanol, acetylene, propane, butane, butadiene, pentane, pentene, cyclopentadiene, hexane, cyclohexane, benzene, toluene, or the like, in a gas state. Then, carbon components existing in the carbon supply sources are combined with one another to form a hexagonal plate-shaped structure, thereby generating graphene.

Then, when the graphene is cooled to room temperature at a rate of about 30-600° C. per minute (i.e., 30° C./min-600° C./min), a graphene sheet having a uniform array state and ripples may be obtained. These ripples are formed due to a difference between the thermal expansion coefficients of the graphene and of the carbonization catalyst. For example, the thermal expansion coefficient of the graphene is about 0.5-0.75×10⁻⁵/K, and the thermal expansion coefficient of Ni, when Ni is used as the carbonization catalyst, is about 1.4× 10⁻⁵/K.

The manufacturer may control the number of synthesized graphene layers by controlling a cooling rate. In other words, the manufacturer may form a desired number of graphene layers (the entire thickness of graphene) by controlling the cooling rate directly or indirectly with respect to the graphene and/or the carbonization catalyst film.

To perform the thermal treatment, a furnace for applying heat to the chamber is used. According to an exemplary embodiment, a method of separating a furnace from a chamber during a cooling process may be used. To this end, a designer may design the furnace and the chamber so that the furnace is easily separated from the chamber as required. Accordingly, the furnace applies heat to the chamber during thermal treatment, and can be separated from the chamber to be moved during cooling, whereby a cooling rate may be controlled to be fast.

According to an exemplary embodiment, a method of separating a chamber from a furnace during cooling may be used. In this case, a designer may design a furnace and a chamber, where graphene is located, so that the chamber may be easily separated from the furnace as required. In this case, heat is applied to the chamber during thermal treatment, and the chamber can be separated from the furnace during cooling, whereby a cooling rate may be controlled to be fast.

According to an exemplary embodiment, during cooling, the furnace and the chamber are fixed, and a catalyst substrate where graphene growth occurs is moved, thereby controlling a cooling rate. By using this method, mass production of graphene through consecutive heating, growth, and cooling is possible by putting a rolled catalyst substrate into a reactor, unrolling one side of the rolled catalyst substrate, passing through a reaction region of the furnace, and rolling the unrolled side thereof.

According to an exemplary embodiment, a graphene sheet having a uniform arrangement state and ripples may be obtained by bringing a carbonization catalyst and a liquid carbon-based material into contact each other, then performing a carburization process of penetrating carbon decomposed from the liquid carbon-based material due to preliminary thermal treatment into the carbonization catalyst, then forming graphene on a carbonization catalyst film by heating the carbonization catalyst film, and then, cooling the graphene to approximately room temperature at a cooling rate of 30° C./min to 600° C./min. As described above, the ripples are formed due to the difference between the thermal expansion coefficients of the graphene and the carbonization catalyst. The direction of the ripples may be arbitrarily set, that is, may be controlled when graphene is formed on or attached to a catalyst layer having multiple thermal expansion coefficients according to regions of the catalyst layer in a specific direction or a carrier physically extended in a specific direction.

The carbonization catalyst and the liquid carbon-based material may contact each other using a process such as dipping. Examples of the liquid carbon-based material may include an organic solvent. Any organic solvent that includes carbon and can be thermally decomposed by the carbonization catalyst may be used as the liquid carbon-based material without limitation. A polar or nonpolar organic solvent having a melting point of 60 to 400° C. may be used as a nonrestrictive example of the organic solvent. Examples of the organic solvent may include an alcohol-based organic solvent, an ether organic solvent, a keton-based organic solvent, an ester-based organic solvent, an organic acid organic solvent, and the like. The alcohol-based organic solvent and the ether organic solvent may be used because they easily adhere to a carbonization metal catalyst, and provide good reactivity and good reduction. When the liquid carbon-based material is used, a carburizing process may be conducted by preliminary thermal treatment, and the liquid carbon-based material may be thermally decomposed by a carbonization catalyst via this preliminary thermal treatment. The preliminary thermal treatment for this thermal decomposition may be performed while the liquid carbon-based material and the carbonization catalyst are being stirred to be sufficiently mixed with each other, and may be performed for 10 minutes to 24 hours at 100 to 400° C.

Besides the above-described methods, any method of forming, and then, cooling a graphene sheet on a graphene growth support including a carbonization catalyst may be used.

The formed graphene sheet is a sheet in which graphene, that forms polycyclic aromatic particles by covalent bonding among a plurality of carbon atoms (typically, referred to as $sp^2$ bonding), is formed. The formed graphene sheet may have ripples locally generated therein. In the graphene sheet, the carbon atoms connected to one another by covalent bonding form a six-membered ring as a basic repetition unit. However, the graphene sheet may further include a five-membered ring and/or a seven-membered ring. The structure of the graphene sheet having the ripples may depend on the content of the five-membered and/or seven-membered ring that may be included in graphene. Generally, a side end portion of the graphene sheet is saturated with hydrogen atoms.

For example, the ripple-formed graphene sheet may be a large-scale graphene sheet having lengthwise and breadthwise lengths ranging from 1 mm to 1,000 mm. Alternatively, the ripple-formed graphene sheet may be a graphene sheet having a homogenous structure with few defects. The width and the area of a ripple of the graphene sheet may depend on the cooling degree.

A growth support of the graphene sheet, such as a carbonization catalyst film or which includes a carbonization film, contacting the rear surface of the graphene sheet may or may not be removed to be used. For example, when a graphene sheet is transferred to a substrate, a device, or a plate-shaped elastic body as will be described later, a graphene sheet from which the growth support has been removed may be transferred to the substrate or the device, or, if required, a graphene sheet having the growth support may be directly transferred. The growth support may be removed by using a wet or dry etching method or the like that uses an acid solution, an alkaline solution, an organic oxide solvent, or the like.

Figure 2A:
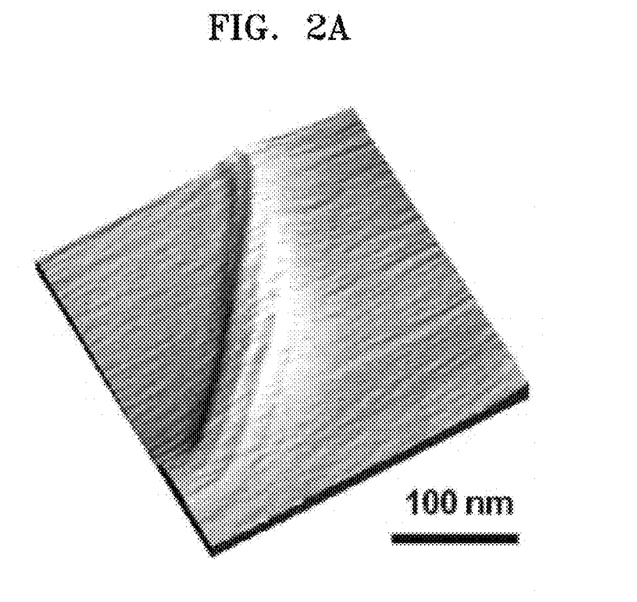
FIG. 2A is a schematic view showing an individual ripple formed on a graphene sheet, according to an exemplary embodiment.
Figure 2B:
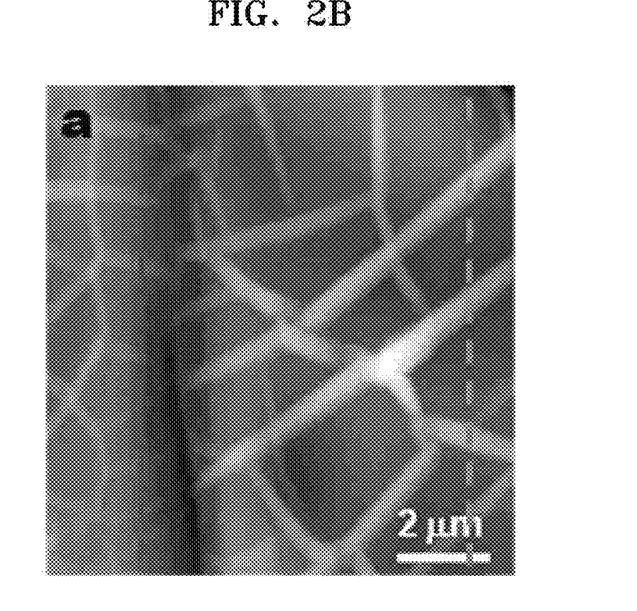
FIG. 2B is a schematic plan view showing ripples formed on the graphene sheet, according to an exemplary embodiment.

FIG. 2A is a schematic view showing an individual ripple formed on a graphene sheet, according to an exemplary embodiment. FIG. 2B is a schematic plan view showing ripples formed on the graphene sheet, according to an exemplary embodiment.

Referring to FIG. 2A, the individual ripple is formed on the graphene sheet. Referring to FIG. 2B, the ripples are irregularly formed on the graphene sheet. As described above, the ripples are formed due to the difference between the thermal expansion coefficients of a graphene growth support and of the graphene sheet.

The ripples may provide deformation-capability to the graphene sheet. When an external force causing various types of deformation, such as bending, spreading, extending, compression, twisting, warping, wrinkling, rolling or the like is applied to the graphene sheet, a mechanical damage such as a crack or a fracture may be generated on the graphene sheet. The mechanical damage may affect the electrical properties such as an increase of an electrical resistance value or the like. In a case where ripples are formed on the graphene sheet during the formation of the graphene sheet, the graphene sheet may cope with an external force through folding, unfolding, or the like of the ripples. This countermeasure may prevent or suppress the possibility that the physical properties are changed due to deformation of the graphene sheet such as bending, spreading, extending, compression, twisting, warping, wrinkling, rolling, or the like. A local response of the ripples to the external force is compared with a response of the entire sheet to the external force. The ripples facilitate prevention or suppression of the occurrence of a mechanical damage such as a crack or a fracture, and a change in the electrical properties of the graphene sheet may be easily prevented or suppressed.

The ripple-formed graphene sheet may tolerate, for example, deformation greater than 0% and no more than 5%. Here, the deformation 5% may indicate stretching the ripple-formed graphene sheet to 105% of an original length of the ripple-formed graphene sheet.

Figure 2C:
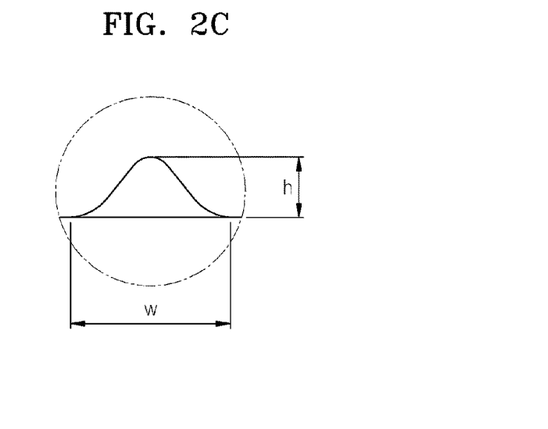
FIG. 2C is a schematic diagram showing a cross-section (taken along a line AA') of the individual ripple formed on the graphene sheet as shown in FIG. 2A, according to an exemplary embodiment.

FIG. 2C is a schematic diagram showing a cross-section (taken along a line AA') of the individual ripple formed on the graphene sheet as shown in FIG. 2A, according to an exemplary embodiment. Referring to FIG. 2C, the ripple has a height h and a width w. The height h may be 50-300 nm, and the width w may be 10-200 nm. The ripple may be changed in height and/or width according to a cooling rate and/or a thickness of a graphene sheet formed. For example, the ripple may have a difference in height and width of about 10 to 30 times compared to those of a rising and falling profile, such as a wavy shape or a buckle shape, that provides additional deformation-capability as will be described later. This difference may vary according to a deformation previously applied to an elastic body, a thickness of a graphene sheet, or the like.

Measurement of the height and the width of a ripple, a wavy shape, or a buckle shape may involve using Atomic Force Microscopy (AFM) to measure at a scale of micrometers, or may involve using an optical profiler to measure at a scale greater than micrometers.

According to an exemplary embodiment, when a graphene sheet is formed on a graphene growth support including a carbonization catalyst and then cooled, a percentage of formed ripples, a shape irregularity thereof, a height of each individual ripple, a width thereof, and the like may be controlled by changing the cooling rate.

When the graphene growth support and the graphene have different thermal expansion coefficients and the cooling rate is high, the percentage of generated ripples may increase due to rapid cooling, the height of the individual ripple may increase, and the width thereof may decrease. On the other hand, as the cooling rate decreases, the height of the individual ripple may decrease and the width thereof may increase.

For example, when a graphene sheet is formed and cooled on a graphene growth support including a carbonization catalyst, the cooling rate may be controlled to be within the cooling rate range of 30 to 200° C. per minute. When the cooling rate is higher than the cooling rate range, a crack may be generated in the graphene growth support. When the cooling rate is lower than the cooling rate range, ripples may not be generated. Within the cooling rate range, the height and width of the individual ripple may be 50-300 nm and 10-200 nm, respectively, as described above.

According to an exemplary embodiment, when a graphene sheet is formed on a graphene growth support including a carbonization catalyst, a percentage of ripples formed on the graphene sheet, a shape irregularity thereof, a height of each individual ripple, a width thereof, and the like may be controlled by changing a thickness of the graphene sheet.

The graphene sheet may be formed of a single layer of graphene or of a plurality of layers (a maximum number of 300 layers) of graphene that are stacked. A percentage of formed ripples, a shape irregularity thereof, a height of each individual ripple, a width thereof, and the like may be controlled according to a thickness of the graphene sheet formed of one or more layers of graphene that are stacked.

For example, the thickness of the graphene sheet may be controlled to be within the range of 1 to 50 layers. If the thickness of the grapheme sheet exceeds the thickness range, the graphene sheet may have the physical properties of graphite instead of the physical properties of graphene itself. In addition, if the graphene sheet is thick, it may be difficult to generate ripples. Within the thickness range, the height and the width of an individual ripple may be 50-300 nm and 10-200 nm, respectively, as described above.

A method of additionally providing deformation-capability to a deformation-capable graphene sheet will now be described.

The ripples formed on a grapheme sheet provide deformation-capability to the graphene sheet. However, by applying a repeatedly rising and falling profile having a height and a width greater than those of the ripples, in addition to the ripples to the graphene sheet, additional deformation-capability in addition to the deformation-capability generated due to the ripples may be provided to the graphene sheet.

For example, a stretched elastic body may be used to additionally provide deformation-capability to the graphene sheet.

In other words, as described above, by making a graphene sheet primarily having deformation-capability due to the ripples contact with the stretched elastic body and then shrinking back the stretched elastic body, the graphene sheet having the ripples may have a rising and falling profile having a height and a width greater than those of the ripples by the shrinking.

Figure 9A:
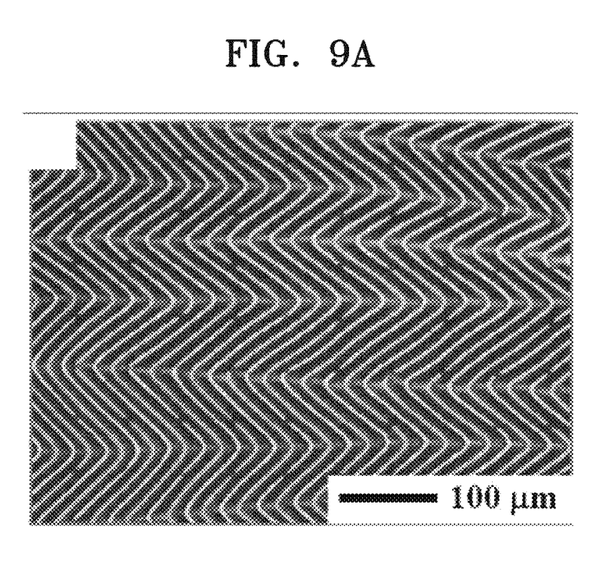
FIGS. 9A and 9B illustrate a herringbone shaped pattern formed due to isotropic expansion, according to an exemplary embodiment.
Figure 9B:
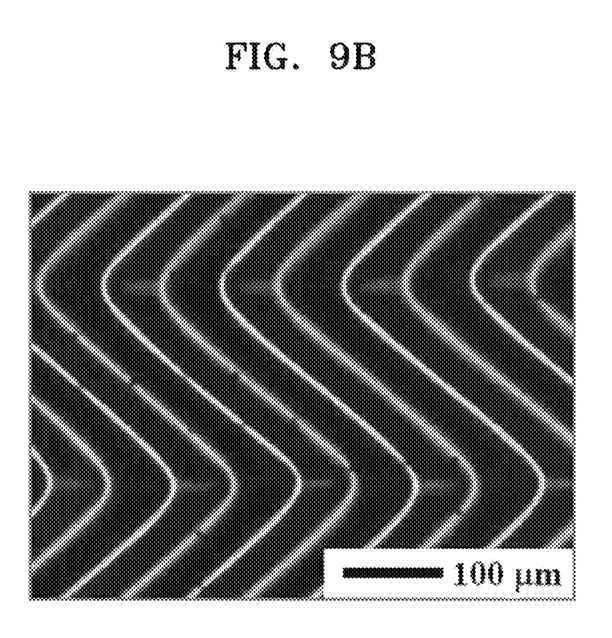

The elastic body may be a plate-shaped elastic body, according to an exemplary embodiment. The plate-shaped elastic body stretched in a direction of one axis or a plate-shaped elastic body stretched in directions of two axes. When the plate-shaped elastic body stretched in the first axis direction is used, a graphene sheet having a profile that repeatedly rises and falls in a direction of one axis may be obtained. When the plate-shaped elastic body stretched in directions of two axes is used, a graphene sheet having a profile that repeatedly rises and falls in the directions of two axes may be obtained. A plate-shaped elastic body stretched in the directions of at least three axes may be used as the plate-shaped elastic body. For example, a plate-shaped elastic body stretched in the directions of four axes may be used as the plate-shaped elastic body. A plate-shaped elastic body stretched in all directions may be used as the plate-shaped elastic body. In this case, a graphene sheet contacting the plate-shaped elastic body is isotropically expanded, and ripples are formed on the graphene sheet due to the isotropical expansion. A pattern of the ripples may have a herringbone shape as illustrated in FIGS. 9A and 9B which show herringbone shaped patterns formed due to isotropic expansion although the herringbone shaped patterns are not patterns formed on a graphene sheet but are general herringbone shaped patterns. The herringbone shaped patterns illustrated in FIGS. 9A and 9B are herringbone shaped patterns of a silicon film that are formed by isotropically expanding a rubber substrate by force, attaching the silicon film onto the isotropically expanded rubber substrate, and then, removing the force applied to the rubber substrate.

A polymer elastic body having silicon-based or ethylene chains such as polydimethyl siloxane (PDMS) may be used as a non-restrictive example of the plate-shaped elastic body.

The deformation-capable graphene sheet having primary ripples, which is to be shrunk using the stretched plate-shaped elastic body, may be used while keeping its sheet shape, or may be used after being cut into a ribbon shape.

Accordingly, the graphene sheet whose deformation-capability has increased may have a ribbon shape that repeatedly rises and falls in a direction of one axis or directions of two axes, or a sheet shape that repeatedly rises and falls in a direction of one axis or directions of two axes.

Figure 3A:
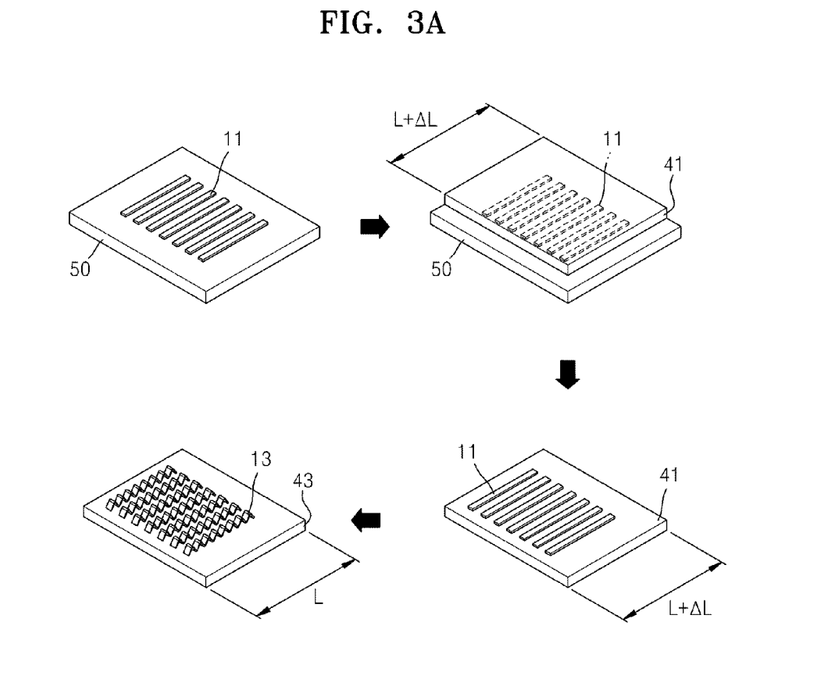
FIGS. 3A and 3B are schematic diagrams showing two methods of giving additional deformation-capability to a graphene sheet, according to exemplary embodiments.
Figure 3B:
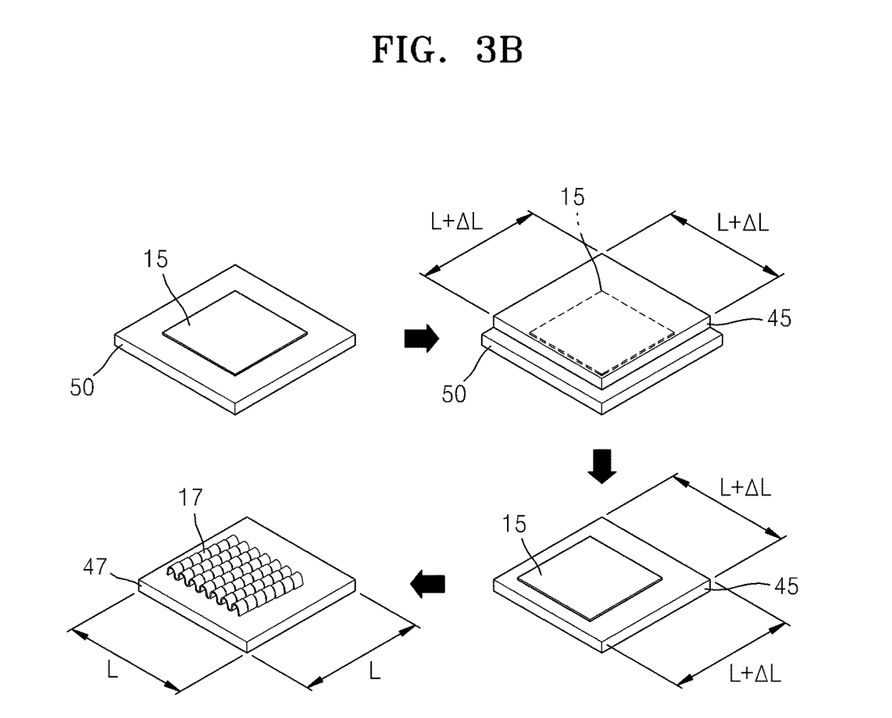

FIGS. 3A and 3B are schematic diagrams showing two methods of providing additional deformation-capability to a graphene sheet, according to exemplary embodiments.

Referring to FIG. 3A, a graphene sheet 11, to which deformation-capability has been provided due to primary formation of ripples, is located on a substrate 50 to have a ribbon shape. The substrate 50 may be a graphene growth support or a substrate different from the graphene growth support on which the graphene sheet 11 is formed.

The ribbon-shaped graphene sheet 11 is transferred while contacting a surface of a plate-shaped elastic body 41 stretched in a direction of one axis (L+ΔL). According to an exemplary embodiment, the plate-shaped elastic body 41 may be stacked over the substrate 50 on which the graphene sheet 11 is formed to transfer the ribbon-shaped graphene sheet 11 from the substrate 50 to the plate-shaped elastic body 41. Thereafter, when the elastic body 41 is shrunk back (L), the graphene sheet 11 is also shrunk, and at the same time a profile that repeatedly rises and falls in a direction of one axis may be generated on a shrunk ribbon-shaped graphene sheet 13 contacting a shrunk elastic body 43. The repetition of rising and falling may be periodic or non-periodic. The shrinkage of the elastic body is not necessarily shrinkage to the original state, and may be shrinkage to an arbitrary state in between the stretched state and the original state.

Referring to FIG. 3B, a graphene sheet 15, to which deformation-capability has been provided due to primary formation of ripples, is located on the substrate 50 while keeping a sheet shape. The substrate 50 may be a graphene growth support or a substrate different from the graphene growth support to which the graphene sheet 15 is transferred.

The graphene sheet 15 is transferred while contacting a surface of a plate-shaped elastic body 45 stretched in directions of two axes [(L+ΔL)×(L+ΔL)]. Thereafter, when the elastic body 45 is shrunk back (L×L), the graphene sheet 15 is also shrunk, and at the same time a profile that repeatedly rises and falls in directions of two axes may be generated on a shrunk graphene sheet 17 contacting a shrunk elastic body 47. The rising and falling repetition may be periodic or non-periodic. The shrinkage of the elastic body is not necessarily shrinkage to the original state, and may be shrinkage to an arbitrary state in between the stretched state and the original state.

A profile that repeatedly rises and falls, which is obtained due to shrinkage of an elastic body after stretching thereof, may provide further deformation-capability to a graphene sheet already provided with deformation-capability due to the primary formation of ripples.

In other words, when the profile that repeatedly rises and falls is provided to a graphene sheet together with ripples, the ripples may cope with an external force applied to the graphene sheet through folding or unfolding or the like, and the profile that repeatedly rises and falls may also cope with the external force through folding or unfolding or the like. Accordingly, the ability of preventing or suppressing an occurrence of a mechanical failure such as a crack or a fracture may be increased. As a result, the ability of preventing or suppressing a change in the electrical properties of the graphene sheet may be increased. In other words, the formation of the profile that repeatedly rises and falls may be considered as further application of deformation-capability to the graphene sheet.

A graphene sheet provided with a profile that repeatedly rises and falls while having ripples as described above may tolerate deformation greater than 0% and no more than 30% (for example, stretching greater than 0% and no more than 30%). Moreover, the graphene sheet may tolerate deformation of 10% to 30% exceeding 5% (for example, stretching of 10% to 30%). This deformation-capability may be considered as a result of application of further deformation-capability as compared with a result of application of deformation-capability within a range of about 5% or less due to primary formation of only ripples.

As such, although a method of forming a profile on a graphene sheet by using a stretched plate-shaped elastic body has been described above to provide deformation-capability to the graphene sheet, the present inventive concept is not limited thereto. In other words, a profile may be formed without using the plate-shaped elastic body. For example, at least one profile may be formed on a graphene sheet by transferring the graphene sheet to a substrate to which graphene is to be transferred and which is stretched by force and then by removing the applied force from the substrate, thereby providing deformation-capability to the graphene sheet. In other words, at least one profile may be formed on the graphene sheet by stretching at least a portion of the substrate, to which graphene is to be transferred, and transferring the graphene to the substrate, and the formed profile may provide deformation-capability to the graphene sheet.

For example, a graphene sheet may be stretched by directly applying a force to a substrate to which the graphene sheet is to be attached in all directions of the graphene sheet. In detail, after an edge(s) of the substrate on which the graphene sheet is to be attached is fixed, a center of the substrate is pulled by force so that the substrate is stretched. In this case, the substrate is isotropically expanded. When graphene is transferred to the isotropically expanded substrate and the force is removed from the substrate, at least one profile is formed on the graphene sheet. The pattern of the profile may have a herringbone shape as described above.

Figure 4A:
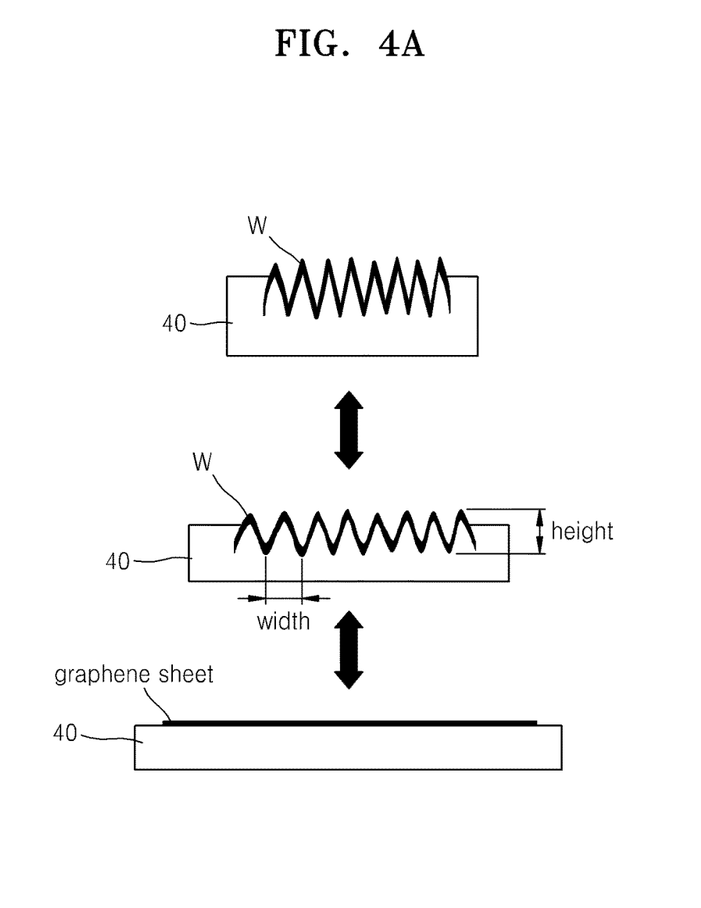
FIGS. 4A and 4B are schematic diagrams showing two types of graphene sheets having profiles that repeatedly rise and fall, according to exemplary embodiments.
Figure 4B:
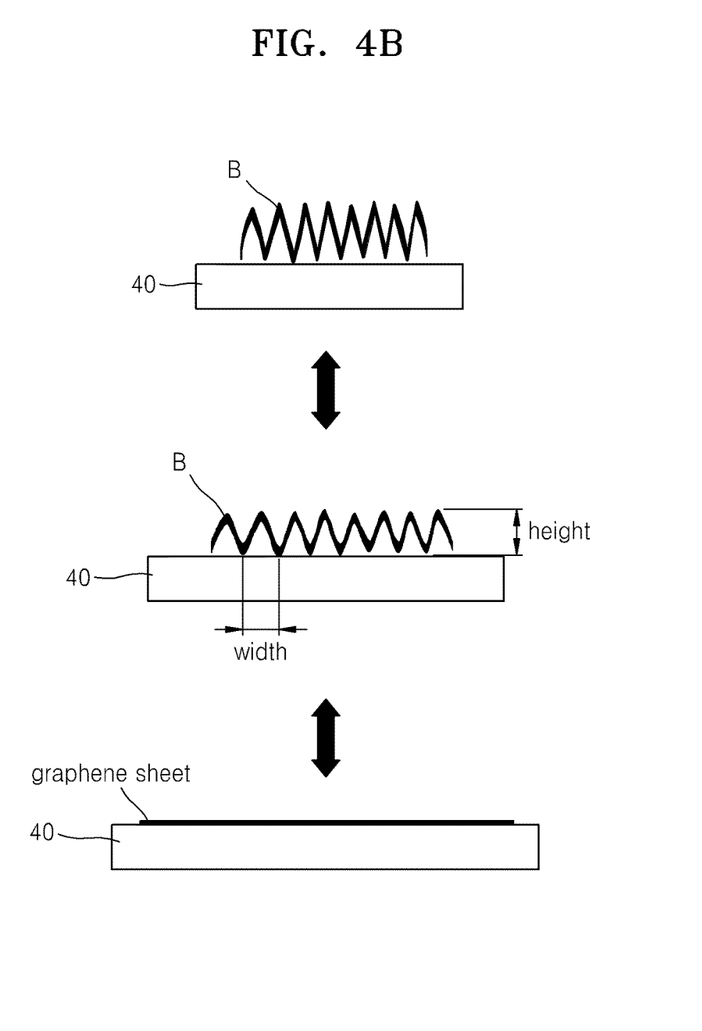

FIGS. 4A and 4B are schematic diagrams showing two types of graphene sheets having profiles that repeatedly rise and fall, according to exemplary embodiments.

Referring to FIGS. 4A and 4B, a graphene sheet on an elastic body 40 has a profile repeatedly rising and falling together with the elastic body 40, that is, a wavy shape W (FIG. 4A), or a profile repeatedly rising and falling while only inflection points of the profile contact the elastic body 40, that is, a buckle shape B (FIG. 4B).

This profile that repeatedly rises and falls responds to an external force by narrowing, extremely and completely folding out, or the like, thereby providing further deformation-capability to the graphene sheet. Therefore, the graphene sheet may prevent or reduce a change in electrical properties, mechanical properties, or the like. The buckle shape may provide more deformation-capability than the wavy shape. The buckle shape may be a result of application of deformation greater than the wavy shape (for example, an elastic body may be more greatly stretched and then shrunk). For example, when the deformation is less than 10%, the wavy shape mainly appears. When the deformation exceeds 10%, a buckle shape may mainly appear. When the deformation is around 10%, either of or both of the wavy shape and the buckle shape may appear. The buckle shape may appear even when adhesiveness between the graphene sheet and an elastic substrate is weak, in addition to when high deformation exceeding 10% is generated.

An individual wave or buckle has a height and a width. According to an exemplary embodiment, the height may be 1-10 μm, and the width may be 1-30 μm. According to an exemplary embodiment, the height and the width of the individual wave or buckle may be compared with the 50-300 nm (nanometer) height of the ripple and the 10-200 nm width thereof. According to an exemplary embodiment, the wave or buckle may have a difference in height and/or width of about 10-30 times compared to that of the ripple.

According to exemplary embodiments, a graphene sheet obtained by bringing a deformation-capable graphene sheet into contact with a flexible elastic body serving as a substrate may be used as a deformation-capable material. The deformation-capable graphene sheet is a graphene sheet to which deformation-capability is primarily provided through ripples, or a graphene sheet to which further deformation-capability has been provided through the profile repeatedly rising and falling in addition to the deformation-capability primarily provided by the ripples, for example, a graphene sheet having a wavy shape or a buckle shape.

This deformation-capable graphene sheet or deformation-capable material may prevent or suppress changes of electrical properties or mechanical properties by coping with various types of deformation. Moreover, since graphene is highly transparent, the graphene may be used as an electrode material of various electrical and electronic devices that require flexibility or the like.

For example, the graphene is used as an electrode material of various electrical and electronic devices, such as a next-generation field effect transistor (FET), diode, or the like that requires transformability such as stretchability, bendability, flexibility, or the like, or is used in various devices such as a high-end sensor such as pixels of a display, a bio tape, surgery gloves, a surface sensor of a multi joint robot, a hemispherical optoelectronic device, and the like. Thus, in spite of external deformation, the performance of a device using the graphene may be maintained by preventing or reducing a change in resistance.

Moreover, this deformation-capable graphene sheet or deformation-capable material may be compressed or stretched in one direction, in both directions, or in all directions so as to be used. In this case, the conductor-semiconductor property may be controlled. Since the resistance of graphene compressed in at least two directions is seldom changed when the graphene is folded or bent, the graphene may be used as a material used to form the electrode of a flexible electronic device that requires mechanical deformation such as folding, stretching, or the like.

The deformation-capable graphene sheet or deformation-capable material may control resistance according to a stretching degree. This feature may be used in electronic devices, sensors, or the like.

Non-restrictive exemplary embodiments will now be described in detail.

EMBODIMENTS

Embodiment 1

A graphene growth support was formed by sequentially coating the upper surface of a 5 cm×5 cm silicon substrate with $SiO_2$ to a thickness of 300 nm and Ni to a thickness of 10-600 nm.

The graphene growth support was put into a furnace of a quartz tube. First, an oxide film was removed from a Ni surface, and $H_2$/Ar flowed at 900-1100° C. and at 100/200 sccm for one hour so as to increase a grain size of Ni catalyst. Then, while maintaining the same temperature as 900-1100° C., $CH_4$/$H_2$/Ar flowed at 50/65/200 sccm for 30 seconds to 20 minutes to manufacture a graphene sheet on the graphene growth support to have a thickness corresponding to 10 or less layers. Referring to FIG. 1C, the number of layers of graphene may be controlled by changing a thickness of a catalyst layer and a growth time. As the growth time is shorter and the catalyst layer is thinner, a distribution of monolayer graphene increases.

Thereafter, a graphene sheet having ripples was formed by running Ar at 200 sccm and cooling at a rate of 100° C./min. The thermal expansion coefficient of the graphene growth support is $1.4 \times 10^{-5}$/K, and the thermal expansion coefficient of graphene is $0.5\text{-}0.75 \times 10^{-5}$/K. The difference between the thermal expansion coefficients is about 2-3 times.

The obtained sample may be represented as a Si/$SiO_2$/Ni/graphene sheet. The Si/SiO2/Ni/graphene sheet sample was put into a water tank containing a $FeCl_3$ 1 M (molarity) solution, and Ni was etched. Ni may be etched after $SiO_2$ is first etched, instead of the above case where Ni is etched first. $SiO_2$ etching may be conducted longer than Ni etching.

The graphene sheet was detached from the silicon substrate during Ni etching. Since the graphene sheet is hydrophobic, the graphene sheet floated on the $FeCl_3$ solution. The graphene sheet was collected by transferring the graphene sheet to a special substrate and taking the graphene sheet out of the water tank. Ripples were formed on the collected graphene sheet so as to have a height of 50-70 nm and a width of 70-100 nm. The height and the width of the ripples were measured by AFM. The same measuring method was applied to the embodiments below.

Embodiment 2

To confirm that the height and the width of the ripples can be controlled by changing a cooling rate, ripples were formed in the same method as that in Embodiment 1, but a cooling rate was different from that in Embodiment 1, that is, 200° C./min. Consequently, the ripples had a height of about 90-120 nm and a width of about 50-70 nm, which are different from those in Embodiment 1.

Embodiment 3

To confirm that the height and the width of the ripples can be controlled by changing the thickness of a graphene sheet, ripples were formed in the same method as that in Embodiment 1, but the thickness of the graphene sheet was different from that in Embodiment 1, that is, 20 layers. Consequently, the ripples had a height of about 30-50 nm and a width of about 100-120 nm, which are different from those in Embodiment 1.

Embodiment 4

After transferring a graphene sheet to a special substrate and taking the graphene sheet out of a water tank as in Embodiment 1, the graphene sheet on the special substrate was transferred to a PDMS substrate which was a stretched elastic substrate. The elastic substrate was stretched from 4 cm×4 cm to 4 cm×5 cm by being extended in a direction of one axis. When a stretched elastic substrate having a hydrophobic surface, for example, a PDMS substrate, is used, a method of transferring a graphene sheet floating on the $FeCl_3$ solution right to the surface of the elastic substrate may be used.

After the graphene sheet was transferred, the elastic substrate was shrunk back to obtain a 4 cm×4 cm elastic substrate. Equipment capable of stretching and compressing the elastic substrate was manufactured in-house and used to shrink the elastic substrate.

The obtained graphene sheet had a wavy-shaped or buckle-shaped profile that repeatedly rises and falls on the elastic substrate in a direction of one axis. A wave or buckle formed in Embodiment 4 had a height of 1-10 μm and a width of 1-30 μm.

Embodiment 5

The condition of Embodiment 5 was the same as that of Embodiment 4 except that an elastic substrate having a 5 cm×5 cm size by extending a 4 cm×4 cm elastic substrate in directions of two axes by 1 cm per each direction was used. After a graphene sheet was transferred, the elastic substrate was shrunk back to have a 4 cm×4 cm size.

The obtained graphene sheet had a wavy-shaped or buckle-shaped profile that repeatedly rises and falls on the elastic substrate in directions of two axes. A wave or buckle formed in Embodiment 5 had a height of 1-10 μm and a width of 1-30 μm.

Experiment

The graphene sheet of Embodiment 1 was transferred onto a PDMS substrate which was an elastic substrate. In Embodiments 4 and 5, since the elastic substrate was attached to the graphene sheet, the elastic substrate was used as it was. The graphene sheet and the elastic substrate are referred to as deformation-capable materials according to each embodiment.

A resistance value obtained by bending the deformation-capable material of Embodiment 1 by using an in-house manufactured bending device was measured. A resistance value depending on stretching (%) was measured while stretching the deformation-capable materials of Embodiments 1, 4, and 5 by using an in-house manufactured compression or stretching apparatus. The stretching (%) was determined by measuring a percentage of a length extended from the original length, and the measurement of the resistance value was conducted using a four-probe apparatus.

Figure 5:
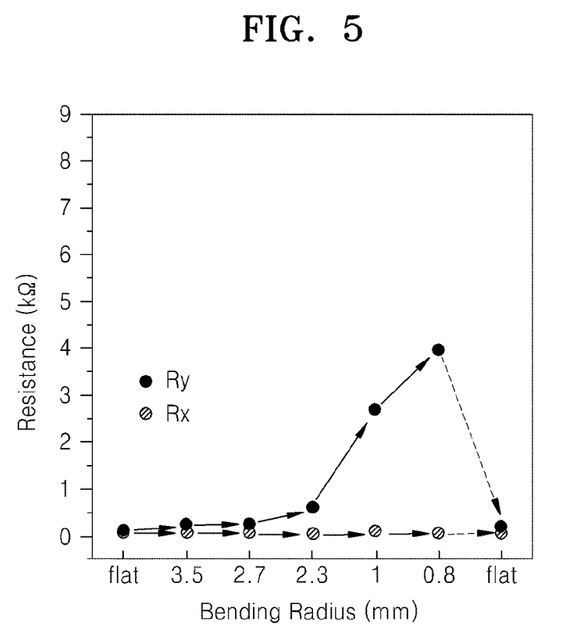
FIG. 5 is a graph showing resistance variations Rx and Ry according to x axis (a first axis) and y axis (a second axis for bending) when a deformation-capable material according to Embodiment 1 stretches in a y axis direction, according to an exemplary embodiment.

FIG. 5 is a graph showing resistance variations Rx and Ry according to x axis (a first axis) and y axis (a second axis for bending) when a deformation-capable material according to Embodiment 1 is bent in a y axis direction. The horizontal axis in the graph denotes a bending radius (mm) which is a radius of a bent portion when the deformation-capable material is bent and the vertical axis in the graph denotes resistance (kΩ).

Referring to FIG. 5, there is little resistance difference when the bending radius is 3.5 mm. When the bending radius is 2.3 mm, the resistance difference is slightly increased, and keeps increasing until 0.8 mm. When the deformation-capable material becomes flat, the resistance difference is restored back to the original resistance difference.

Figure 6:
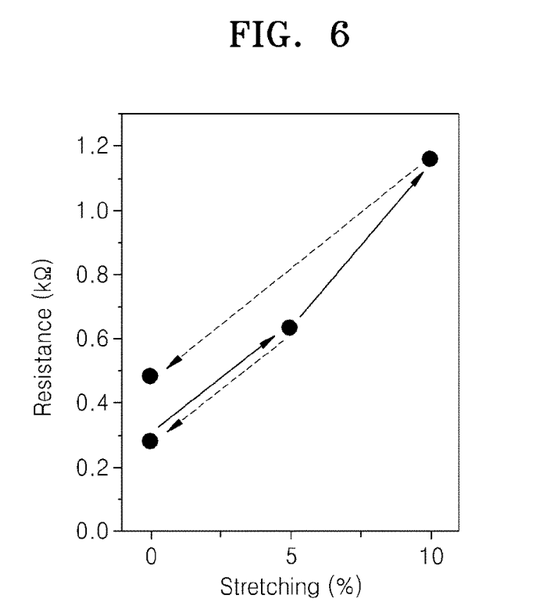
FIG. 6 is a graph showing the resistance variation according to the y axis which is for stretching when the deformation-capable material according to Embodiment 1 stretches in y axis direction, according to an exemplary embodiment.

FIG. 6 is a graph showing the resistance variation according to the y axis which is for stretching when the deformation-capable material according to Embodiment 1 stretches in y axis direction. Here, the horizontal axis in the graph denotes stretching (%) and the vertical axis in the graph denotes resistance (kΩ).

Referring to FIG. 6, in the stretching in the range of 0 to 5%, when stretching returns to 0%, resistance is recovered reversibly.

Figure 7:
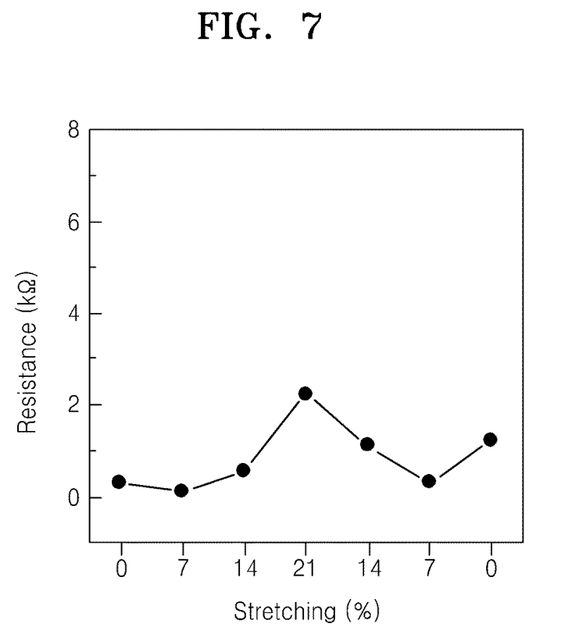
FIG. 7 is a graph showing the resistance variation according to the y axis which is for stretching when a deformation-capable material according to Embodiment 4 of the present invention stretches in the y axis direction, according to an exemplary embodiment.

FIG. 7 is a graph showing the resistance variation according to the y axis which is for stretching when a deformation-capable material according to Embodiment 4 stretches in the y axis direction. The horizontal axis in the graph denotes stretching (%) and the vertical axis in the graph denotes resistance (kΩ).

Referring to FIG. 7, even when stretching reaches 14%, the resistance variation is small. When stretching increases up to 21%, the resistance value is slightly increased. However, when the stretching returns to 0%, the resistance value is also restored to the original value.

Figure 8:
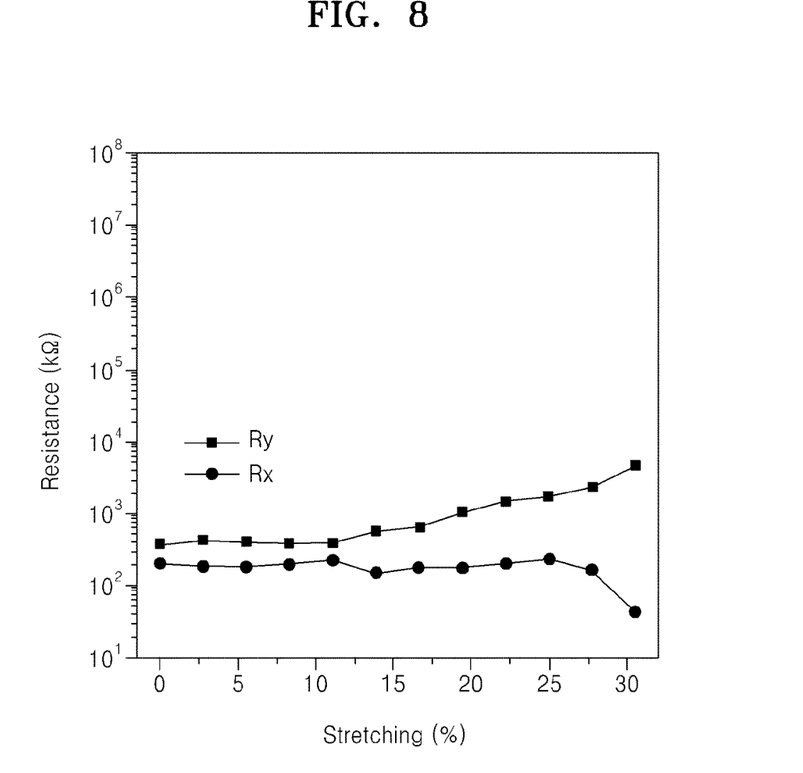
FIG. 8 is a graph showing resistance variations Rx and Ry of the x axis (a first axis) and y axis (a second axis for stretching) when a deformation-capable material according to Embodiment 5 stretches in y axis direction, according to an exemplary embodiment.

FIG. 8 is a graph showing resistance variations Rx and Ry of the x axis (a first axis) and y axis (a second axis for stretching) when a deformation-capable material according to Embodiment 5 stretches in a y axis direction. The horizontal axis in the graph denotes stretching (%) and the vertical axis in the graph denotes resistance (kΩ).

Referring to FIG. 8, the resistance variations Rx and Ry are very small until the stretching is 10%, and the resistance variations Rx and Ry are still small even when the stretching exceeds 10%. Even when the stretching reaches 30%, the resistance variations Rx and Ry are not large.

According to the exemplary embodiments, at least one ripple that provide deformation-capability may be formed on a graphene sheet while carbon sources are provided onto a graphene growth support including a carbonization catalyst to form the graphene sheet. Therefore, deformation-capability may be easily provided to the graphene sheet, and may be controlled by changing the size of the at least one ripple.

Moreover, deformation-capability may be further provided to the deformation-capable graphene sheet. The deformation-capable graphene sheet is used as an electrode material or the like in various devices, whereby performance can be maintained even when a device is deformed.

While the exemplary embodiments have been particularly shown and described with reference to the attached drawings, it will be understood by those of ordinary skill in the art that various changes in form and details may be made thereto or therein without departing from the spirit and scope of the present inventive concept as defined by the following claims.

What is claimed is:

1. A method of manufacturing a graphene sheet, the method comprising:

growing a graphene sheet on a graphene growth support by applying carbon sources and heat to the graphene growth support, the graphene growth support comprising a carbonization catalyst; and forming at least one ripple on the graphene sheet by cooling at least one of the graphene growth support and the graphene sheet, wherein the graphene growth support has a thermal expansion coefficient which is different from a thermal expansion coefficient of the graphene sheet.

2. The method of claim 1, wherein the thermal expansion coefficient of the graphene growth support is greater than the thermal expansion coefficient of the graphene sheet.

3. The method of claim 1, wherein the carbonization catalyst is a carbonization catalyst layer, the method further comprising controlling at least one of a thickness of the carbonization catalyst layer and a time taken for the growing the graphene sheet, thereby to control a thickness of the graphene sheet which is grown or a number of graphene layers constituting the graphene sheet which is grown.

4. The method of claim 1, wherein at least one of a height and a width of the at least one ripple is controlled by changing at least one of a thickness of the graphene sheet and a cooling rate.

5. The method of claim 1, further comprising:
bringing the ripple-formed graphene sheet into contact with a stretched elastic body; and
forming a profile repeatedly rising and falling on the graphene sheet by shrinking the stretched elastic body to increase deformation-capability.

6. The method of claim 5, wherein the profile has a wavy shape or a buckle shape.

7. The method of claim 5, wherein the profile repeatedly rises and falls in a direction of one axis or in directions of at least two axes.

8. The method of claim 5, wherein the stretched elastic body is stretched in a direction of one axis or in directions of multiple axes.

9. The method of claim 5, wherein the elastic body is a polymer elastic body having silicon-based or ethylene chains.

10. The method of claim 5, wherein a height and a width of the at least one ripple is smaller than a height and a width of the profile, respectively.

* * * * *